F. J. MILLER.
FRUIT PICKER.
APPLICATION FILED OCT. 11, 1920.
1,387,064.
Patented Aug. 9, 1921.
2 SHEETS—SHEET 1.
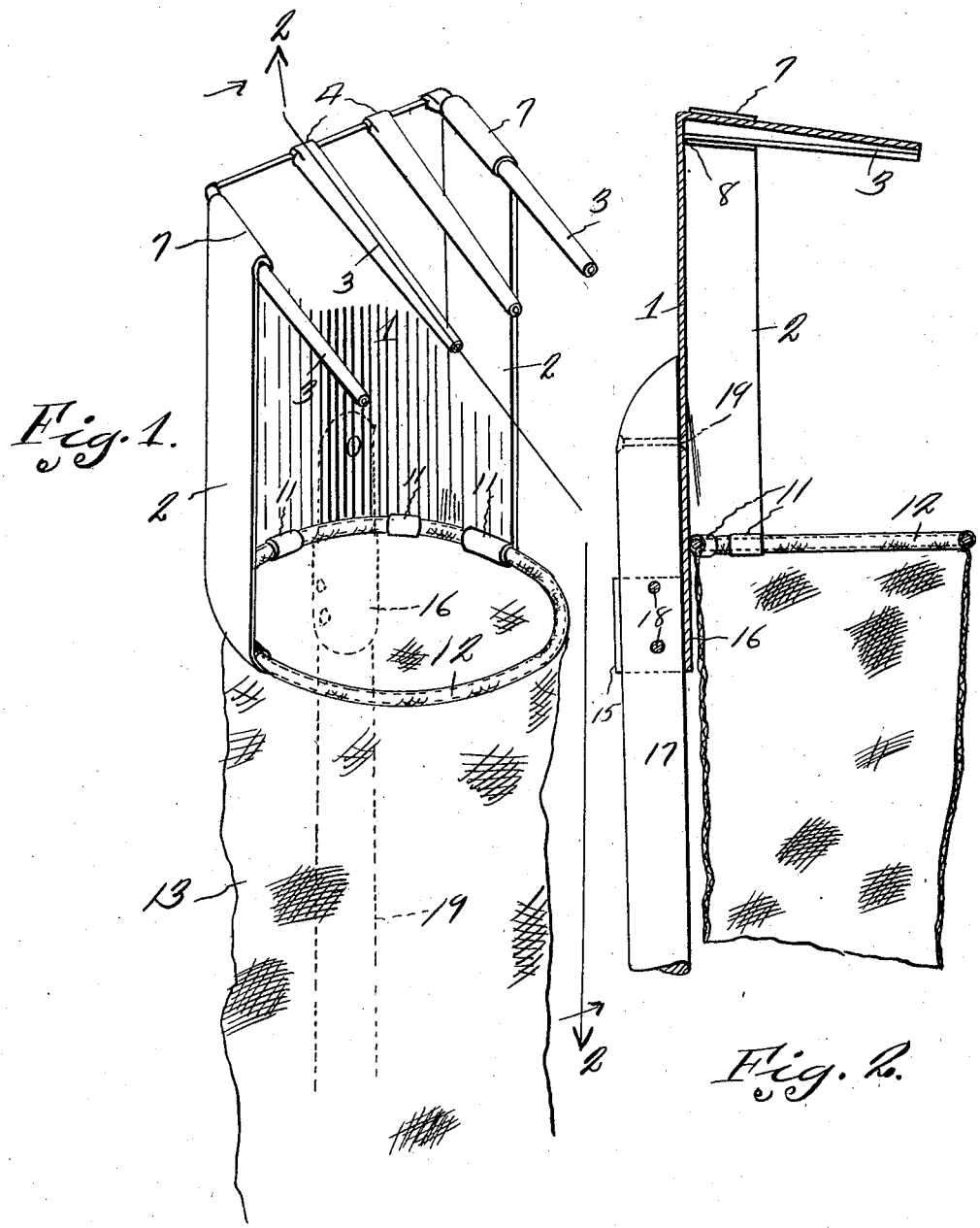
Inventor
F. J. Miller
By Philip A. H. Sewell
His Attorney

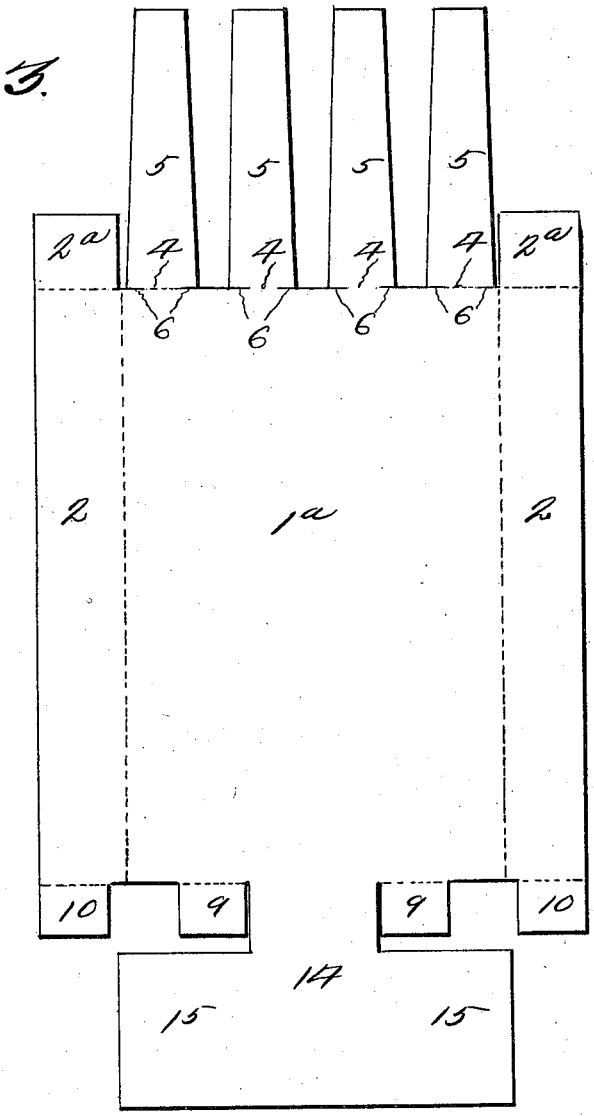

UNITED STATES PATENT OFFICE.

FRED J. MILLER, OF SILVER CITY, IOWA.

FRUIT-PICKER.

1,387,064. Specification of Letters Patent. Patented Aug. 9, 1921.

Application filed October 11, 1920. Serial No. 416,088.

*To all whom it may concern:*

Be it known that I, FRED J. MILLER, a citizen of the United States, residing at Silver City, in the county of Mills and State of Iowa, have invented certain new and useful Improvements in Fruit-Pickers, of which the following is a specification, reference being had therein to the accompanying drawing.

The invention relates to fruit pickers and has for its object to provide a device of this character formed from sheet metal and provided with downwardly inclined fruit engaging fingers disposed over a canvas chute carried by the body member, said body member having secured to its lower edge a supporting handle and a canvas chute ring to which the chute is attached.

A further object is to provide a fruit picker, fruit engaging members and fingers, formed from a single sheet of sheet metal, said sheet being so shaped that the fruit engaging fingers may be formed adjacent the top of the sheet, the sides of the body member being formed and provided with portions adapted to be bent over the outer fingers. The lower end of the sheet is formed with a T-shaped extension which may be bent to form a collar for the supporting handle, there also being extensions on the lower end of the sheet which may be bent for forming rolls for holding and supporting the canvas chute supporting ring.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the fruit picker.

Fig. 2 is a vertical sectional view taken on line 2—2 of Fig. 1.

Fig. 3 is a plan view of the blank from which the body portion and fingers of the picker is formed.

Referring to the drawings, the numeral 1 designates the body portion of the picker and 2 the side flanges thereof. Extending inwardly from the upper end of the body portion 1 are spaced hollow fingers 3, which fingers are integrally joined to the body portion 1 as at 4 and are formed from the flat extensions 5 of the blank 1ª there being slits 6 adjacent the lower ends of the extension 5 which allow the extension to be formed into fingers, substantially circular in cross section after the extensions 5 have been bent inwardly to the proper angle. The upper ends of the sides 2 are provided with extensions 2ª, which extensions are formed into rolls 7 which encircle the outer fingers 3, thereby bracing said fingers. The centrally disposed fingers 3 are soldered or brazed as at 8 to prevent them from bending during a fruit picking operation. Extending downwardly from the body portion 1ª and the sides 2 of the blank are extensions 9 and 10, said extensions being provided to form rolls 11 for receiving and holding the canvas chute supporting ring 12, said chute being designated by the numeral 13. Thus it will be seen that a fruit picker is provided which is formed from a single sheet of material which may be stamped out and folded to the shape shown in Fig. 1. Extending downwardly from the lower end of the sheet 1ª, the T-shaped extension 14, the arms 15 of which may be bent so as to form a collar 16 for receiving the upper end of the handle 17, rivets 18 extend through the collar and the handle for holding the body member thereon. An additional rivet 19 is provided for additionally bracing the body member in relation to the handle.

From the above it will be seen that a fruit picker is provided which is formed from a single sheet of material and one which may be cheaply constructed and easily assembled.

The invention having been set forth what is claimed as new and useful is:—

1. A fruit picker formed from sheet metal and comprising a vertically disposed body portion having side flanges, inwardly extending sheet metal fingers integrally joined to the upper end of the body member, sleeves carried by the upper end of the side flanges and encircling the outer fingers, integral sleeves carried by the lower ends of the body member and the side flanges for receiving a canvas chute ring, and an integral downwardly extending handle receiving collar carried by the lower end of the body member.

2. A fruit picker comprising a flanged body member having inwardly extending fingers at its upper end integrally joined to the body member and an integral handle receiving collar at the lower end of the body member, integral sleeves adjacent the lower end of the body member and a canvas holding ring horizontally disposed and held in said sleeves adjacent the lower end of the body member.

3. A fruit picker comprising a flanged body member having fingers at its upper end, and canvas chute supporting ring holding means and handle receiving collar at its lower end, said flanged body member, its fingers, supporting ring holding means and handle collar being formed from a single sheet of material.

In testimony whereof I hereunto affix my signature.

FRED J. MILLER.